(12) United States Patent
Palanisamy Chinnathambi et al.

(10) Patent No.: US 8,226,841 B2
(45) Date of Patent: Jul. 24, 2012

(54) POLISHING COMPOSITION FOR NICKEL-PHOSPHOROUS MEMORY DISKS

(75) Inventors: Selvaraj Palanisamy Chinnathambi, Taman Jurong (SG); Haresh Siriwardane, Palm Garden (SG)

(73) Assignee: Cabot Microelectronics Corporation, Aurora, IL (US)

( * ) Notice: Subject to any disclaimer, the term of this patent is extended or adjusted under 35 U.S.C. 154(b) by 424 days.

(21) Appl. No.: 12/364,937

(22) Filed: Feb. 3, 2009

(65) Prior Publication Data

US 2010/0193470 A1    Aug. 5, 2010

(51) Int. Cl.
*C03C 15/00* (2006.01)

(52) U.S. Cl. ............ 216/89; 216/88; 216/90; 216/91; 216/96; 216/100; 216/102; 216/103; 252/79.1; 252/79.4

(58) Field of Classification Search .............. None
See application file for complete search history.

(56) References Cited

U.S. PATENT DOCUMENTS

| | | | |
|---|---|---|---|
| 5,693,239 A | 12/1997 | Wang et al. | |
| 6,461,227 B1 | 10/2002 | Fang | |
| 6,468,137 B1 | 10/2002 | Fang et al. | |
| 6,471,884 B1 | 10/2002 | Fang et al. | |
| 6,569,215 B2 * | 5/2003 | Miyata | 51/307 |
| 6,755,721 B2 * | 6/2004 | Ward et al. | 451/28 |
| 6,896,591 B2 * | 5/2005 | Chaneyalew et al. | 451/41 |
| 6,945,851 B2 | 9/2005 | Ward et al. | |
| 6,976,905 B1 | 12/2005 | Fang et al. | |
| 7,419,911 B2 | 9/2008 | Chelle et al. | |
| 2003/0171072 A1 | 9/2003 | Ward et al. | |
| 2004/0157535 A1 | 8/2004 | Chaneyalew et al. | |
| 2005/0003746 A1 | 1/2005 | Fujii et al. | |
| 2005/0020187 A1 | 1/2005 | Ward et al. | |
| 2005/0279030 A1 | 12/2005 | Ward et al. | |
| 2005/0282387 A1 | 12/2005 | Sato et al. | |
| 2006/0096496 A1 * | 5/2006 | Sun et al. | 106/3 |
| 2008/0227370 A1 * | 9/2008 | Fujii et al. | 451/37 |

FOREIGN PATENT DOCUMENTS

JP   2-84485 A    3/1990
JP   9-316430 A   12/1997

OTHER PUBLICATIONS

S. Lin et al., Thin Solid Films, vol. 483, 2005, pp. 400-406.*

* cited by examiner

*Primary Examiner* — Lan Vinh
*Assistant Examiner* — Jiong-Ping Lu
(74) *Attorney, Agent, or Firm* — Thomas E. Omholt; Francis J. Koszyk; Steven D. Weseman

(57) ABSTRACT

The invention provides a chemical-mechanical polishing composition comprising alpha alumina, fumed alumina, silica, an oxidizing agent that oxidizes nickel-phosphorous, oxalic acid, optionally, tartaric acid, optionally, a nonionic surfactant, optionally, a biocide, and water. The invention also provides a method of chemically-mechanically polishing a substrate comprising contacting a substrate with a polishing pad and the chemical-mechanical polishing composition, moving the polishing pad and the polishing composition relative to the substrate, and abrading at least a portion of the substrate to polish the substrate.

11 Claims, No Drawings

POLISHING COMPOSITION FOR NICKEL-PHOSPHOROUS MEMORY DISKS

BACKGROUND OF THE INVENTION

The demand for increased storage capacity in memory or rigid disks and the trend towards miniaturization of memory or rigid disks (due to the requirement for smaller hard drives in computer equipment) continues to emphasize the importance of the memory or rigid disk manufacturing process, including the planarization or polishing of such disks for ensuring maximal performance. While there exist several chemical-mechanical polishing (CMP) compositions and methods for use in conjunction with semiconductor device manufacture, few conventional CMP methods or commercially available CMP compositions are well-suited for the planarization or polishing of memory or rigid disks.

As the demand for increased storage capacity has increased, so has the need for improved processes for the polishing of such memory or rigid disks. The term "memory or rigid disk" refers to any magnetic disk, hard disk, rigid disk, or memory disk for retaining information in electromagnetic form. The memory or rigid disk typically has a surface that comprises nickel-phosphorus, but the memory or rigid disk surface can comprise any other suitable material. The planarity of the memory or rigid disks must be improved, as the distance between the recording head of a disk drive and the surface of the memory or rigid disk has decreased with improvements in recording density that demand a lower flying height of the magnetic head with respect to the memory or rigid disk. In order to permit a lower flying height of the magnetic head, improvements to the surface finish of the memory or rigid disk are required.

In addition, environmental regulations in many countries limit the amount of organic material in wastewater streams that can be released into the environment. Many polishing compositions used in semiconductor manufacturing are based on water as the liquid carrier. Disposal of waste polishing compositions requires treatment of the compositions to reduce the levels of pollutants, such as the content of organic material in the polishing compositions, which adds to the cost of manufacturing processes. One measure of water quality is known as chemical oxygen demand. Chemical oxygen demand is a measure of the amount of oxygen required to fully oxidize organic material in a waste stream to carbon dioxide, ammonia, and water. Accordingly, there is a need in the art for polishing compositions exhibiting a reduced chemical oxygen demand in order to meet increasing stringent environmental demands.

BRIEF SUMMARY OF THE INVENTION

The invention provides a chemical-mechanical polishing composition comprising (a) alpha alumina, (b) fined alumina, (c) silica, (d) an oxidizing agent that oxidizes nickel-phosphorous, (e) about 0.1 wt. % to about 5 wt. % of oxalic acid, (f) optionally, about 0.1 wt. % to about 2 wt. % of tartaric acid, (g) optionally, a nonionic surfactant, (h) optionally, a biocide, and (i) water, wherein the polishing composition has a pH of about 2 to about 4.

The invention also provides a method of chemically-mechanically polishing a substrate comprising (i) contacting a substrate with a polishing pad and a chemical-mechanical polishing composition comprising (a) alpha alumina, (b) fumed alumina, (c) silica, (d) an oxidizing agent that oxidizes nickel-phosphorous, (e) about 0.1 wt. % to about 5 wt. % of oxalic acid, (f) optionally, about 0.1 wt. % to about 2 wt. % of tartaric acid, (g) optionally, a nonionic surfactant, (h) optionally, a biocide, and (i) water, wherein the polishing composition has a pH of about 2 to about 4, (ii) moving the polishing pad relative to the substrate with the chemical mechanical polishing composition therebetween, and (iii) abrading at least a portion of the substrate to polish the substrate.

DETAILED DESCRIPTION OF THE INVENTION

The invention provides a chemical-mechanical polishing composition comprising, consisting essentially of, or consisting of (a) alpha alumina, (b) fumed alumina, (c) silica, (d) an oxidizing agent that oxidizes nickel-phosphorous, (e) about 0.1 wt. % to about 5 wt. % of oxalic acid, (f) optionally, about 0.1 wt. % to about 2 wt. % of tartaric acid, (g) optionally, a nonionic surfactant, (h) optionally, a biocide, and (i) water, wherein the polishing composition has a pH of about 2 to about 4.

The polishing composition comprises a mixture of fumed alumina, alpha alumina, and silica. Fumed metal oxides, e.g., fumed alumina and fumed silica, can be prepared from any suitable volatile or nonvolatile precursor. Fumed metal oxides can be produced from volatile precursors by hydrolysis and/or oxidation of the precursors (e.g., metal chloride) in a high temperature flame ($H_2$/air or $H_2$/$CH_4$/air) to produce the metal oxide of interest. Fumed metal oxides can be prepared from nonvolatile precursors by dissolving or dispersing the precursor in a suitable solvent such as water, alcohol, or acid-based solvent. The solution containing the precursor can be sprayed into a high temperature flame using a droplet generator, and the metal oxide aggregate then can be collected. Typical droplet generators include bi-fluid atomizers, high pressure spray nozzles, and ultrasonic atomizers.

Fumed alumina is an amorphous form of aluminum oxide, whereas alpha alumina refers to a crystalline polymorph of aluminum oxide formed at high temperatures above 1400° C. Alpha alumina typically refers to alumina comprising about 50 wt. % or more of the alpha polymorph. As used herein, the amount of alpha alumina in the polishing composition refers to the total weight of crystalline alumina present therein, wherein about 50 wt. % or more of the crystalline alumina comprises the alpha polymorph. Fumed alumina is typically less abrasive than alpha alumina. Both forms of alumina are well known in the art and available commercially in a wide range of particle sizes and surface areas.

The silica can be any suitable form of silica such as wet-process type or fumed silica. Preferably, the silica comprises wet-process type silica particles (e.g., condensation-polymerized or precipitated silica particles). Condensation-polymerized silica particles typically are prepared by condensing $Si(OH)_4$ to form colloidal particles, where colloidal is defined as having an average particle size between about 1 nm and about 1000 nm. Such abrasive particles can be prepared in accordance with U.S. Pat. No. 5,230,833 or can be obtained as any of various commercially available products, such as the Akzo-Nobel Bindzil 50/80 product and the Nalco 1050, 1060, 2327, and 2329 products, as well as other similar products available from DuPont, Bayer, Applied Research, Nissan Chemical, Fuso, and Clariant.

The fumed alumina can have any suitable average particle size (i.e., average particle diameter). The fumed alumina can have an average particle size of about 30 nm or more, e.g., about 40 nm or more, about 50 nm or more, about 60 nm or more, about 70 nm or more, about 80 nm or more, about 90 nm or more, or about 100 nm or more. Alternatively, or in addition, the fumed alumina can have an average particle size of about 250 nm or less, e.g., about 230 nm or less, 210 nm or less, 190 nm or less, 170 nm or less, or 150 nm or less. Thus, the fumed alumina can have an average particle size bounded by any two of the above endpoints. For example, the fumed alumina can have an average particle size of about 30 nm to about 250 nm, about 80 nm to about 250 nm, about 80 nm to about 210 nm, or about 100 nm to about 150 nm.

The alpha alumina can have any suitable average particle size (i.e., average particle diameter). The alpha alumina can have an average particle size of about 100 nm or more, e.g., about 150 nm or more, about 200 nm or more, about 250 nm or more, about 300 nm or more, about 350 nm or more, about 400 nm or more, or about 450 nm or more. Alternatively, or in addition, the alpha alumina can have an average particle size of about 800 nm or less, e.g., about 750 nm or less, 650 nm or less, 600 nm or less, 550 nm or less, about 500 nm or less, about 450 nm or less, or about 400 nm or less. Thus, the alpha alumina can have an average particle size bounded by any two of the above endpoints. For example, the alpha alumina can have an average particle size of about 100 nm to about 800 nm, about 150 nm to about 800 nm, about 150 nm to about 500 nm, about 150 nm to about 400 nm, about 200 nm to about 300 nm, about 400 nm to about 800 nm, about 400 nm to about 700 nm, or about 400 nm to about 600 nm.

The silica can have any suitable average particle size (i.e., average particle diameter). The silica can have an average particle size of about 10 nm or more, e.g., about 15 nm or more, about 20 nm or more, or about 25 nm or more. Alternatively, or in addition, the silica can have an average particle size of about 120 nm or less, e.g., about 110 nm or less, about 100 nm or less, about 90 nm or less, about 80 nm or less, about 70 nm or less, about 60 nm or less, 50 nm or less, or about 40 nm or less. Thus, the silica can have an average particle size bounded by any two of the above endpoints. For example, the silica can have an average particle size of about 10 nm to about 100 nm, about 20 nm to about 100 nm, about 20 nm to about 80 nm, about 20 nm to about 60 nm, or about 20 nm to about 40 nm.

The polishing composition can comprise a mixture of fumed alumina, alpha alumina, and silica in any suitable ratio. Typically, the polishing composition can contain about 0.01 wt. % or more, e.g., about 0.05 wt. % or more, about 0.1 wt. % or more, or about 0.2 wt. % or more of fumed alumina, about 0.1 wt. % or more, e.g., about 0.2 wt. % or more, about 0.3 wt. % or more, about 0.4 wt. % or more, or about 0.5 wt. % or more of alpha alumina, and about 0.1 wt. % or more, e.g., about 0.2 wt. % or more, about 0.3 wt. % or more, about 0.4 wt. % or more, or about 0.5 wt. % or more of silica. Alternatively, or in addition, the polishing composition can contain about 1 wt. % or less, e.g., about 0.9 wt. % or less, about 0.8 wt. % or less, about 0.7 wt. % or less, about 0.6 wt. % or less, or about 0.5 wt. % or less of fumed alumina, about 5 wt. % or less, e.g., about 4 wt. % or less, about 3 wt. % or less, or about 2 wt. % or less of alpha alumina, and about 3 wt. % or less, e.g., about 2 wt. % or less, or about 1 wt. % or less of silica. Thus, the polishing composition can comprise a mixture of fumed alumina, alpha alumina, and silica in amounts bounded by any two of the above endpoints recited for each of fumed alumina, alpha alumina, and silica. For example the polishing composition can comprise about 0.01 wt. % to about 1 wt. %, 0.1 wt. % to about 0.8 wt. %, or about 0.2 wt. % to about 0.6 wt. % of fumed alumina, about 0.1 wt. % to about 5 wt. %, about 0.5 wt. % to about 3 wt. %, or about 1 wt. % to about 2 wt. % of alpha alumina, and about 0.1 wt. % to about 3 wt. %, about 0.2 wt. % to about 2 wt. %, or about 0.5 wt. % to about 1 wt. % of silica.

The abrasive particles preferably are colloidally stable. The term colloid refers to the suspension of abrasive particles in the liquid carrier. Colloidal stability refers to the maintenance of that suspension through time. In the context of this invention, an abrasive is considered colloidally stable if, when the abrasive is placed into a 100 ml graduated cylinder and allowed to stand unagitated for a time of 2 hours, the difference between the concentration of particles in the bottom 50 ml of the graduated cylinder ([B] in terms of g/ml) and the concentration of particles in the top 50 ml of the graduated cylinder ([T] in terms of g/ml) divided by the initial concentration of particles in the abrasive composition ([C] in terms of g/ml) is less than or equal to 0.5 (i.e., $\{[B]-[T]\}/[C] \leq 0.5$). More preferably, the value of [B]−[T]/[C] is less than or equal to 0.3, and most preferably is less than or equal to 0.1.

The polishing composition comprises an oxidizing agent that oxidizes nickel-phosphorous. Preferred oxidizing agents are selected from the group consisting of hydrogen peroxide, urea hydrogen peroxide, peroxysulfuric acid, peroxyacetic acid, perboric acid, salts thereof, and combinations thereof. More preferably, the oxidizing agent is hydrogen peroxide. The oxidizing agent preferably comprises about 10 wt. % or less (e.g., about 8 wt. % or less, about 6 wt. % or less, about 4 wt. % or less, or about 2 wt. % or less) of the polishing composition.

The polishing composition comprises about 0.1 wt. % or more, e.g., about 0.25 wt. % or more, about 0.5 wt. % or more, about 0.75 wt. % or more, or about 1 wt. % or more of oxalic acid. Alternatively, or in addition, the polishing composition can contain about 5 wt. % or less, e.g., about 4 wt. % or less, about 3 wt. % or less, about 2 wt. % or less of oxalic acid, or about 1 wt. % or less of oxalic acid. Thus, the polishing composition can comprise an amount of oxalic acid abounded by any two of the above endpoints. For example, the polishing composition can contain about 0.1 wt. % to about 5 wt. %, about 0.5 wt. % to about 5 wt. %, about 0.5 wt. % to about 4 wt. %, about 0.5 wt. % to about 2 wt. %, about 0.5 wt. % to about 1 wt. %, or about 1 wt. % to about 3 wt. % of oxalic acid.

In some embodiments, the polishing composition does not comprise tartaric acid. In these embodiments, the polishing composition can consist essentially or of consist of alpha alumina, ftuned alumina, silica, an oxidizing agent that oxidizes nickel-phosphorous, oxalic acid, optionally, a nonionic surfactant, optionally, a biocide, and water. In other embodiments, the polishing composition comprises about 0.1 wt. or more, e.g., about 0.2 wt. % or more, about 0.3 wt. % or more, about 0.5 wt. % or more, or about 0.5 wt. % or more of tartaric acid. Alternatively, or in addition, the polishing composition can contain about 2 wt. % or less, e.g., about 1.5 wt. % or less, about 1.25 wt. % or less, about 1 wt. % or less, or about 0.75 wt. % or less of tartaric acid. Thus, the polishing composition can comprise an amount of tartaric acid abounded by any two of the above endpoints. For example, the polishing composition can contain about 0.1 wt. % to about 2 wt. %, about 0.1 wt. % to about 1 wt. %, about 0.1 wt. % to about 0.75 wt. %, or about 0.2 wt. % to about 0.75 wt. % of tartaric acid.

The polishing composition optionally further comprises a biocide. The biocide can be any suitable biocide, for example, an isothiazolinone biocide. The amount of biocide used in the polishing composition typically is about 1 ppm to about 500 ppm, and preferably is about 10 ppm to about 200 ppm.

The polishing composition can have a pH of about 1 or more, e.g., about 2 or more. Alternatively, or in addition, the polishing composition can have a pH of about 5 or less, e.g., about 4 or less, or about 3 or less. Thus, the polishing composition can have a pH bounded by any two of the above endpoints. For example, the polishing composition can have a pH of about 1 to about 5, about 1 to about 4, about 2 to about 4, or about 2 to about 3.

The pH of the polishing composition can be achieved and/or maintained by any suitable means. More specifically, the polishing composition can further comprise a pH adjustor, a pH buffering agent, or a combination thereof. The pH adjustor can be any suitable pH-adjusting compound. For example, the pH adjustor can be nitric acid, sodium hydroxide, potassium hydroxide, ammonium hydroxide, or a combination thereof. The pH buffering agent can be any suitable buffering agent, for example, phosphates, sulfates, acetates, borates, ammonium salts, and the like. The polishing composition can comprise any suitable amount of a pH adjustor and/or a pH buffering agent, provided that a suitable amount of the buffering agent is used to achieve and/or maintain the pH of the polishing composition within the ranges set forth herein.

The polishing composition optionally comprises a nonionic surfactant. The purpose of the nonionic surfactant is to reduce the amount of edge polishing observed in the polishing of metal surfaces and to enhance the removal rate of the metal surface. In the polishing of metal surfaces, typically the edges experience higher downforce from a polishing tool. Because abrasion is in part a function of the pressure applied to the surface, the metal edges experience a faster rate of metal erosion relative to the rest of the surface. The result of such uneven polishing of the metal surface results in edge erosion, which is known in the art as roll-off, rub-off, or dub-off. Without wishing to be bound by any particular theory, it is believed that the nonionic surfactant is adsorbed onto the metal surface, thus forming a lubricating film which preferentially reduces removal rate at the edge(s) of the substrate.

The nonionic surfactant can be any suitable nonionic surfactant. Non-limiting examples of suitable nonionic surfactants include alkylphenol ethoxylates (e.g., nonylphenol ethoxylates), alcohol ethoxylates, siloxane ethoxylates, and the like. Examples of preferred nonionic surfactants include nonylphenol ethoxylates such as the Tergitol NP series available from Dow Corning (Midland, Mich.) and siloxane ethoxylates such as the Silwet series available from General Electric (Schenectady, N.Y.). The polishing composition can contain about 1 ppm or more, e.g., about 5 ppm or more, about 10 ppm or more, or about 20 ppm or more of the nonionic surfactant. Alternatively, or in addition, the polishing composition can contain about 250 ppm or less, e.g., about 200 ppm or less, about 150 ppm or less, about 100 ppm or less, or about 50 ppm or less of the nonionic surfactant. Thus, the polishing composition can contain an amount of nonionic surfactant bounded by any two of the above endpoints. For example, the polishing composition can contain about 1 ppm to about 250 ppm, about 10 ppm to about 200 ppm, or about 20 ppm to about 100 ppm of the nonionic surfactant.

In an embodiment, the polishing composition consists essentially of or consists of fumed alumina, alpha alumina, silica, oxalic acid, an oxidizing agent that oxidizes nickel-phosphorous, oxalic acid, a biocide, and water, wherein the polishing composition has a pH of about 2 to about 4. In another embodiment, the polishing composition consists essentially of or consists of fumed alumina, alpha alumina, silica, oxalic acid, tartaric acid, an oxidizing agent that oxidizes nickel-phosphorous, oxalic acid, a biocide, and water, wherein the polishing composition has a pH of about 2 to about 4. The amounts of fumed alumina, alpha alumina, silica, oxalic acid, tartaric acid, oxidizing agent, and biocide can be as recited herein.

Desirably, the inventive polishing composition comprising oxalic acid exhibits a reduced chemical oxygen demand as compared to polishing compositions comprising other carboxylic acids. Chemical oxygen demand is a measure of the amount of oxygen required to fully oxidize organic material in a waste stream to carbon dioxide, ammonia, and water, and is used as a measure of water quality. Aqueous waste, such as polishing compositions after use, must meet criteria such as chemical oxygen demand prior to release into the environment. Polishing compositions having reduced chemical oxygen demand will require a lower level of treatment prior to environmental release and will therefore exhibit reduced overall process costs.

The polishing composition can be prepared by any suitable technique, many of which are known to those skilled in the art. The polishing composition can be prepared in a batch or continuous process. Generally, the polishing composition can be prepared by combining the components thereof in any order. The term "component" as used herein includes individual ingredients (e.g., fumed alumina, alpha alumina, silica, oxidizing agent that oxidizes nickel-phosphorous, oxalic acid, optional tartaric acid, optional nonionic surfactant, etc.) as well as any combination of ingredients (e.g., fumed alumina, alpha alumina, silica, oxidizing agent that oxidizes nickel-phosphorous, oxalic acid, optional tartaric acid, optional nonionic surfactant, optional biocide, etc.).

For example, the fumed alumina, alpha alumina, and silica can be dispersed in water. The oxalic acid, optional tartaric acid, optional nonionic surfactant, and optional biocide can then be added, and mixed by any method that is capable of incorporating the components into the polishing composition. The oxidizing agent that oxidizes nickel-phosphorous can be added at any time during the preparation of the polishing composition. The polishing composition can be prepared prior to use, with one or more components, such as the oxidizing agent that oxidizes nickel-phosphorous, added to the polishing composition just before use (e.g., within about 1 minute before use, or within about 1 hour before use, or within about 7 days before use). The polishing composition also can be prepared by mixing the components at the surface of the substrate during the polishing operation.

The polishing composition can be supplied as a one-package system comprising fumed alumina, alpha alumina, and silica, oxidizing agent that oxidizes nickel-phosphorous, oxalic acid, optional tartaric acid, optional nonionic surfactant, optional biocide, and water. Alternatively, the fumed alumina, alpha alumina, and silica can be supplied as a dispersion in water in a first container, and oxalic acid, optional tartaric acid, optional nonionic surfactant, and optional biocide can be supplied in a second container, either in dry form, or as a solution or dispersion in water. The oxidizing agent that oxidizes nickel-phosphorous desirably is supplied separately from the other components of the polishing composition and is combined, e.g., by the end-user, with the other components of the polishing composition shortly before use (e.g., 1 week or less prior to use, 1 day or less prior to use, 1 hour or less prior to use, 10 minutes or less prior to use, or 1 minute or less prior to use). The components in the first or second container can be in dry form while the components in the other container can be in the form of an aqueous dispersion. Moreover, it is suitable for the components in the first and second containers to have different pH values, or alternatively to have substantially similar, or even equal, pH values. Other two-container, or three or more-container, combinations of the components of the polishing composition are within the knowledge of one of ordinary skill in the art.

The polishing composition of the invention also can be provided as a concentrate which is intended to be diluted with an appropriate amount of water prior to use. In such an embodiment, the polishing composition concentrate can comprise the fumed alumina, alpha alumina, silica, oxalic acid, optional tartaric acid, optional nonionic surfactant, optional biocide, and water, with or without the oxidizing agent that oxidizes nickel-phosphorous, in amounts such that, upon dilution of the concentrate with an appropriate amount of water, and the oxidizing agent that oxidizes nickel-phosphorous if not already present in an appropriate amount, each component of the polishing composition will be present in the polishing composition in an amount within the appropriate range recited above for each component. For example, the fumed alumina, alpha alumina, silica, oxalic acid, optional tartaric acid, optional nonionic surfactant, and optional biocide can each be present in the concentration in an amount that is about 2 times (e.g., about 3 times, about 4 times, or about 5 times) greater than the concentration recited above for each component so that, when the concentrate is diluted with an equal volume of (e.g., 2 equal volumes of water, 3 equal volumes of water, or 4 equal volumes of water, respectively), along with the oxidizing agent that oxidizes nickel-phosphorous in a suitable amount, each component will be present in the polishing composition in an amount within the ranges set forth above for each component. Furthermore, as will be understood by those of ordinary skill in the art, the concentrate can contain an appropriate fraction of the water present in the final polishing composition in order to ensure that other components are at least partially or fully dissolved in the concentrate.

Embodiments of concentrates wherein the polishing composition contains oxalic acid and tartaric acid desirably exhibit complete solution of the oxalic acid and tartaric acid in the concentrate at the desired operating pH of the polishing composition, whereas embodiments of concentrates containing oxalic acid and no tartaric acid can exhibit incomplete solution of the oxalic acid in the concentrate. While typically dilution with an appropriate amount of water to prepare the polishing composition at the point-of-use will result in complete dissolution of oxalic acid when present in undissolved form in the concentrate, there may be in some instances practical disadvantages to the presence of undissolved oxalic acid in the polishing composition concentrate. In such instances, use of polishing composition concentrates containing both oxalic acid and tartaric acid will avoid the solubility issue at the cost of increasing the chemical oxygen demand of the polishing composition.

The invention also provides a method of chemically-mechanically polishing a substrate with the polishing composition described herein. In particular, the inventive method comprises (i) contacting a substrate with a polishing pad and the chemical-mechanical polishing composition described herein, (ii) moving the polishing pad relative to the substrate with the chemical-mechanical polishing composition therebetween, and (iii) abrading at least a portion of the substrate to polish the substrate.

The substrate to be polished using the method of the invention can be any suitable substrate that contains nickel-phosphorous. A preferred substrate comprises at least one layer comprising nickel-phosphorous. Particularly suitable substrates include, but are not limited to, memory or rigid disks, such as aluminum disks coated with nickel-phosphorous.

The polishing method of the invention is particularly suited for use in conjunction with a chemical-mechanical polishing (CMP) apparatus. Typically, the apparatus comprises a platen, which, when in use, is in motion and has a velocity that results from orbital, linear, or circular motion, a polishing pad in contact with the platen and moving with the platen when in motion, and a carrier that holds a substrate to be polished by contacting and moving relative to the surface of the polishing pad. The polishing of the substrate takes place by the substrate being placed in contact with the polishing pad and the polishing composition of the invention and then the polishing pad moving relative to the substrate, so as to abrade at least a portion of the substrate to polish the substrate.

A substrate can be planarized or polished with the chemical-mechanical polishing composition with any suitable polishing pad (e.g., polishing surface). Suitable polishing pads include, for example, woven and non-woven polishing pads. Moreover, suitable polishing pads can comprise any suitable polymer of varying density, hardness, thickness, compressibility, ability to rebound upon compression, and compression modulus. Suitable polymers include, for example, polyvinylchloride, polyvinylfluoride, nylon, fluorocarbon, polycarbonate, polyester, polyacrylate, polyether, polyethylene, polyamide, polyurethane, polystyrene, polypropylene, coformed products thereof, and mixtures thereof.

Desirably, the CMP apparatus further comprises an in situ polishing endpoint detection system, many of which are known in the art. Techniques for inspecting and monitoring the polishing process by analyzing light or other radiation reflected from a surface of the workpiece are known in the art. Such methods are described, for example, in U.S. Pat. No. 5,196,353, U.S. Pat. No. 5,433,651, U.S. Pat. No. 5,609,511, U.S. Pat. No. 5,643,046, U.S. Pat. No. 5,658,183, U.S. Pat. No. 5,730,642, U.S. Pat. No. 5,838,447, U.S. Pat. No. 5,872,633, U.S. Pat. No. 5,893,796, U.S. Pat. No. 5,949,927, and U.S. Pat. No. 5,964,643. Desirably, the inspection or monitoring of the progress of the polishing process with respect to a workpiece being polished enables the determination of the polishing end-point, i.e., the determination of when to terminate the polishing process with respect to a particular workpiece.

A chemical-mechanical polishing process can be characterized in a number of ways, such as in terms of the removal rate of a substrate, the resulting surface roughness, and the resulting edge roll-off of a substrate.

The removal rate of a substrate can be determined using any suitable technique. Examples of suitable techniques for determining the removal rate of a substrate include weighing the substrate before and after use of the inventive polishing method to determine the amount of substrate removed per unit of polishing time, which can be correlated with the removal rate in terms of thickness of substrate removed per unit of polishing time, and determining the thickness of the substrate before and after use of the inventive polishing method to directly measure the removal rate of the substrate per unit of polishing time.

Measurement of surface roughness is well known in the art. Suitable techniques for the determination of surface roughness of a substrate include surface profilometry, light scattering techniques, interferometry, and atomic force microscopy. Instrumentation useful in determining surface roughness is commercially available from vendors including Schmitt Industries (Portland, Oreg.), Lightmachinery, Inc. (CA), and Veeco Instruments (Plainfield, N.Y.). Microwaviness of a substrate can be determined using any suitable technique. Examples of suitable techniques for determining the microwaviness of a substrate include optical methods such as incidence interferometry, using instruments available from, for example, Zygo Corp. (Middlefield, Conn.).

As previously discussed herein, roll-off refers to a deviation in planarity of a nickel-phosphorous coated aluminum memory disk caused by the increased removal rate of the nickel-phosphorous layer at the edge of the disk, where the disk experiences greater downforce than the remainder of the disk. As a result, the outermost section of a memory disk exhibits a curvature. Determination of the extent of roll-off can be performed by measuring the curvature of the memory disk with a technique such as interferometry. Instrumentation useful in determining roll-off is commercially available from vendors including Zygo Corp. (Middlefield, Conn.) and Veeco Instruments (Plainfield, N.Y.).

The following examples further illustrate the invention but, of course, should not be construed as in any way limiting its scope.

Example 1

This example demonstrates the effect of oxalic acid on the removal rate, edge roll-off, and microwaviness achievable by the inventive polishing compositions in the polishing of separate substrates comprising nickel-phosphorous-coated aluminum memory disks.

Three separate substrates comprising nickel-phosphorous-coated aluminum memory disks were separately polished on one side with three different polishing compositions. Each of the polishing compositions contained 0.4 wt. % fumed alumina with an average particle size of 120 nm, 1.6 wt. % of alpha alumina with an average particle size of 500 nm, 1.0 wt. % of silica with an average particle size of 32 nm, 50 ppm of a nonionic surfactant, tartaric acid or oxalic acid, and 1.2 wt. % of hydrogen peroxide, at a pH of 2.4. Polishing Composition 1A (comparative) contained 2.0 wt. % tartaric acid. Polishing Composition 1B (comparative) contained 1.5 wt. % tartaric acid. Polishing Composition 1C (invention) contained 2.0 wt. % oxalic acid.

After polishing, the removal rate, edge roll-off, and microwaviness of each substrate was determined, and the results are summarized in Table 1. In addition, the chemical oxygen demand ("COD") for each of the polishing compositions was determined and set forth in Table 1.

TABLE 1

| Polishing Composition | Removal Rate (mg/min) | Edge Roll-Off | Microwaviness (Å) | COD |
|---|---|---|---|---|
| 1A (comparative) | 66.0 | 185.6 | 4.5 | 12000 |
| 1B (comparative) | 62.1 | 140.6 | 4.5 | 6320 |
| 1C (invention) | 70.9 | 82.9 | 4.7 | 2562 |

As is apparent from the results set forth in Table 1, the inventive polishing composition containing oxalic acid exhibited a nickel-phosphorous removal rate that was approximately equal to the nickel-phosphorous removal rate exhibited by the comparative polishing compositions containing tartaric acid, while producing a microwaviness approximately the same as and an edge roll-off that was approximately 45% and 59% of the edge roll-off exhibited by the two comparative polishing compositions. In addition, the inventive polishing composition had a chemical oxygen demand that was approximately 21% and 53% of the chemical oxygen demand of the two comparative polishing compositions.

Example 2

This example demonstrates the solubility characteristics of aqueous concentrates comprising oxalic acid and mixtures of oxalic acid and tartaric acid.

Four aqueous concentrates were formulated (Compositions 2A, 2B, 2C, and 2D) by the addition of oxalic acid or a mixture of oxalic acid and tartaric acid followed by adjustment of the pH of the composition to 2.1. Composition 2A contained 8.0 wt. % oxalic acid. Composition 2B contained 4.0 wt. % oxalic acid and 4.0 wt. % tartaric acid. Composition 2C contained 3.5 wt. % oxalic acid and 3.5 wt. % tartaric acid. Composition 2D contained 3.0 wt. % oxalic acid and 3.0 wt. % tartaric acid.

The compositions were visually inspected after adjustment of the pH to determine presence or absence of undissolved material. Composition 2A was found to contain undissolved material (oxalic acid), whereas Compositions 2B-2D were found to be homogeneous and did not contain undissolved material.

Example 3

This example demonstrates the effect of oxalic acid and of mixtures of oxalic acid and tartaric acid on the removal rate, edge roll-off, and microwaviness achievable by the inventive polishing composition in the polishing of substrates comprising nickel-phosphorous-coated aluminum memory disks.

Four separate substrates comprising nickel-phosphorous-coated aluminum memory disks were separately polished on one side with different polishing compositions. Each of the polishing compositions contained 0.4 wt. % fumed alumina with an average particle size of 120 nm, 1.6 wt. % of alpha alumina with an average particle size of 500 nm, 1.0 wt. % of silica with an average particle size of 32 nm, 50 ppm of a nonionic surfactant, oxalic acid or a combination of oxalic acid and tartaric acid, and 1.2 wt. % of hydrogen peroxide, at a pH of 2.1. Polishing Composition 3A contained 2.0 wt. % oxalic acid. Polishing Composition 3B contained 1.0 wt. % oxalic acid and 1.0 wt. % tartaric acid. Polishing Composition 3C contained 0.875 wt. % oxalic acid and 0.875 wt. % tartaric acid. Polishing Composition 3D contained 0.75 wt. % and 0.75 wt. % oxalic acid.

After polishing, the removal rate, edge roll-off, and microwaviness of each substrate was determined, and the results are summarized in Table 2. In addition, the chemical oxygen demand ("COD") for each of the polishing compositions was calculated and set forth in Table 2.

TABLE 2

| Polishing Composition | Oxalic Acid (wt. %) | Tartaric Acid (wt. %) | Removal Rate (mg/min) | Edge Roll-off (side A) | Microwaviness (Å) | COD |
|---|---|---|---|---|---|---|
| 3A | 2.0 | 0 | 70.0 | 73.6 | 4.3 | 3554 |
| 3B | 1.0 | 1.0 | 70.1 | 56.4 | 4.4 | 7107 |
| 3C | 0.875 | 0.875 | 70.5 | 66.4 | 4.4 | 6219 |
| 3D | 0.75 | 0.75 | 74.6 | 60.1 | 4.2 | 5330 |

As is apparent from the results set forth in Table 2, Polishing Compositions 3B-3D, which contained both oxalic acid and tartaric acid, exhibited similar removal rates and microwaviness as compared to Polishing Composition 3A, which contained oxalic acid and no tartaric acid. Polishing Compositions 3B, 3C, and 3D, which contained both oxalic acid and tartaric acid, exhibited edge roll-offs that were approximately 77%, 90%, and 82%, respectively, of the edge roll-off exhibited by Polishing Composition 3A. Polishing Compositions 3B-3D have theoretical chemical oxygen demand values that are greater than the chemical oxygen demand of Polishing Composition 3A.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

The invention claimed is:

1. A method of chemically-mechanically polishing a substrate comprising:
   (i) contacting a substrate with a polishing pad and a chemical-mechanical polishing composition comprising:
      (a) alpha alumina,
      (b) fumed alumina,
      (c) silica,
      (d) an oxidizing agent that oxidizes nickel-phosphorous,
      (e) about 0.1 wt. % to about 2 wt. % of oxalic acid,
      (f) about 0.1 wt % to 0.75 wt. % tartaric acid,
      (g) a nonionic surfactant,
      (h) optionally, a biocide, and
      (i) water,
      wherein the polishing composition has a pH of about 2 to about 4,
   (ii) moving the polishing pad relative to the substrate with the chemical-mechanical polishing composition therebetween, and
   (iii) abrading at least a portion of the substrate to polish the substrate,
   wherein the substrate comprises a nickel-phosphorous-coated aluminum disk.

2. The method of claim 1, wherein the polishing composition comprises about 0.5 wt. % to about 2 wt. % of alpha alumina, about 0.1 wt. % to about 1 wt. % of fumed alumina, and about 0.5 wt. % to about 2 wt. % of silica.

3. The method of claim 1, wherein the alpha alumina has an average particle size of about 300 nm to about 800 nm.

4. The method of claim 3, wherein the alpha alumina has an average particle size of about 400 nm to about 600 nm.

5. The method of claim 1, wherein the fumed alumina has an average particle size of about 75 nm to about 150 nm.

6. The method of claim 1, wherein the silica has an average particle size of about 20 nm to about 120 nm.

7. The method of claim 1, wherein the oxidizing agent is hydrogen peroxide.

8. The method of claim 1, wherein the polishing composition comprises about 10 ppm to about 200 ppm of the nonionic surfactant.

9. The method of claim 8, wherein the nonionic surfactant is a nonylphenol ethoxylate or a siloxane ethoxylate.

10. The method of claim 1, wherein the pH of the polishing composition is about 2 to about 3.

11. The method of claim 1, wherein the disk is a memory disk.

* * * * *